(12) United States Patent
Faruque et al.

(10) Patent No.: US 12,304,296 B2
(45) Date of Patent: May 20, 2025

(54) BATTERY PACK FOR ELECTRIC VEHICLE

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 17/949,318

(22) Filed: Sep. 21, 2022

(65) Prior Publication Data
US 2024/0092156 A1 Mar. 21, 2024

(51) Int. Cl.
| | | |
|---|---|---|
| *B60K 1/04* | (2019.01) | |
| *B60L 50/64* | (2019.01) | |
| *H01M 50/249* | (2021.01) | |

(52) U.S. Cl.
CPC ............... *B60K 1/04* (2013.01); *B60L 50/64* (2019.02); *H01M 50/249* (2021.01); *B60K 2001/0405* (2013.01); *H01M 2220/20* (2013.01)

(58) Field of Classification Search
CPC .............. B60K 1/04; B60K 2001/0405; B60K 2001/0438; B60L 50/64; H01M 50/249; H01M 2220/20
See application file for complete search history.

(56) References Cited

U.S. PATENT DOCUMENTS

| | | | |
|---|---|---|---|
| 2022/0134857 A1 | 5/2022 | Baccouche et al. | |
| 2022/0250684 A1* | 8/2022 | Renegar | F16F 7/12 |

FOREIGN PATENT DOCUMENTS

| | | | | |
|---|---|---|---|---|
| CN | 114475790 A | * | 5/2022 | ............... B60K 1/04 |
| DE | 102010050826 A1 | * | 5/2012 | ............... B60K 1/04 |
| WO | 2013053433 | | 4/2013 | |
| WO | 2020058037 | | 3/2020 | |

OTHER PUBLICATIONS

Translation of DE-102010050826-A1 relied upon in the office action. (Year: 2012).*

* cited by examiner

*Primary Examiner* — James A Shriver, II
*Assistant Examiner* — Nicholas R. Kandas
(74) *Attorney, Agent, or Firm* — Burris Law, PLLC (57) ABSTRACT

A battery pack for an electric vehicle includes a battery housing and a pair of rocker structures. The battery housing is configured to house power storage units. The pair of rocker structures are located at opposing sides of the battery housing and are configured to mount the battery pack to a vehicle body structure. Each rocker structure includes a variable width along a length of the rocker structure. The battery housing includes a region that corresponds to a widest portion of each rocker structure.

20 Claims, 6 Drawing Sheets

BATTERY PACK FOR ELECTRIC VEHICLE

FIELD

The present disclosure relates to a battery pack for an electric vehicle and an electric vehicle including a battery pack.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location within the electric vehicle, the battery pack may be susceptible to various vehicle loads.

The present disclosure addresses the integration of rechargeable battery packs in electric vehicles.

SUMMARY

This section provides a general summary of the disclosure and is not a comprehensive disclosure of its full scope or all of its features.

In one form, the present disclosure provides a battery pack for an electric vehicle. The battery pack includes a battery housing and a pair of rocker structures. The battery housing is configured to house power storage units. The pair of rocker structures are located at opposing sides of the battery housing and are configured to mount the battery pack to a vehicle body structure. Each rocker structure includes a variable width along a length of the rocker structure. The battery housing includes a region that corresponds to a widest portion of each rocker structure.

In variations of the battery pack of the above paragraph, which may be implemented individually or in combination: the widest portion of each rocker structure is located near a middle section of each rocker; each rocker structure includes a rear section, a front section, and a middle section, the middle section is the widest portion of each rocker structure, the middle section having a length that is at least two times greater than a length of the rear section and is at least two times greater than a length of the front section; the middle section defines an elongated cavity; the widest portion of each rocker structure defines an elongated cavity; a foam material is disposed within the elongated cavity; the widest portion of each rocker structure is located near a middle section of each rocker; a cover plate is secured to a respective rocker structure and covers an opening to the elongated cavity; each rocker structure includes internal stiffening members; the widest portion of each rocker structure is at least four times greater than a narrowest portion of each rocker structure; the widest portion of each rocker structure is at least two times greater than the narrowest portion of each rocker structure; and the region of the battery housing that corresponds to the widest portion of each rocker structure is a middle region, a width of the middle region is less than a width of a rear region of the battery housing and a width of a front region of the battery housing.

In another form, the present disclosure provides a battery pack for an electric vehicle. The battery pack includes a battery housing and a pair of rocker structures. The battery housing is configured to house power storage units. The pair of rocker structures are secured to opposing sides of the battery housing and are configured to mount the battery pack to a vehicle body structure. Each rocker structure includes a variable width along a length of the rocker structure and includes an elongated cavity and mounting apertures. The mounting apertures are located outboard of the elongated cavity and are configured to mount the pair of rocker structures to the vehicle body structure. The battery housing includes a region that corresponds to a widest portion of each rocker structure. The elongated cavity is located at the widest portion of each rocker structure.

In yet another form, the present disclosure provides an electric vehicle that includes a vehicle body structure and a vehicle battery pack. The vehicle body structure including a pair of side frames. The vehicle battery pack includes a battery housing and a pair of rocker structures. The battery housing is configured to house battery components. The pair of rocker structures are secured to opposing sides of the battery housing and are configured to mount the battery pack to the pair of side frames of the vehicle body structure. Each rocker structure has a variable width along a length of the rocker structure and includes an elongated cavity and mounting apertures. The mounting apertures are located outboard of the elongated cavity. The battery housing includes a region that corresponds to a widest portion of each rocker structure. The elongated cavity being located at the widest portion of each rocker structure.

In variations of the electric vehicle of the above paragraph, which may be implemented individually or in combination: the vehicle body structure includes vertical body-mounted pillars, the widest portion of each rocker structure extends in a forward direction past a respective vertical body-mounted pillar and extends in a rear direction past the respective vertical body-mounted pillar; and a cover plate is secured to a respective rocker structure and covers an opening to the elongated cavity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
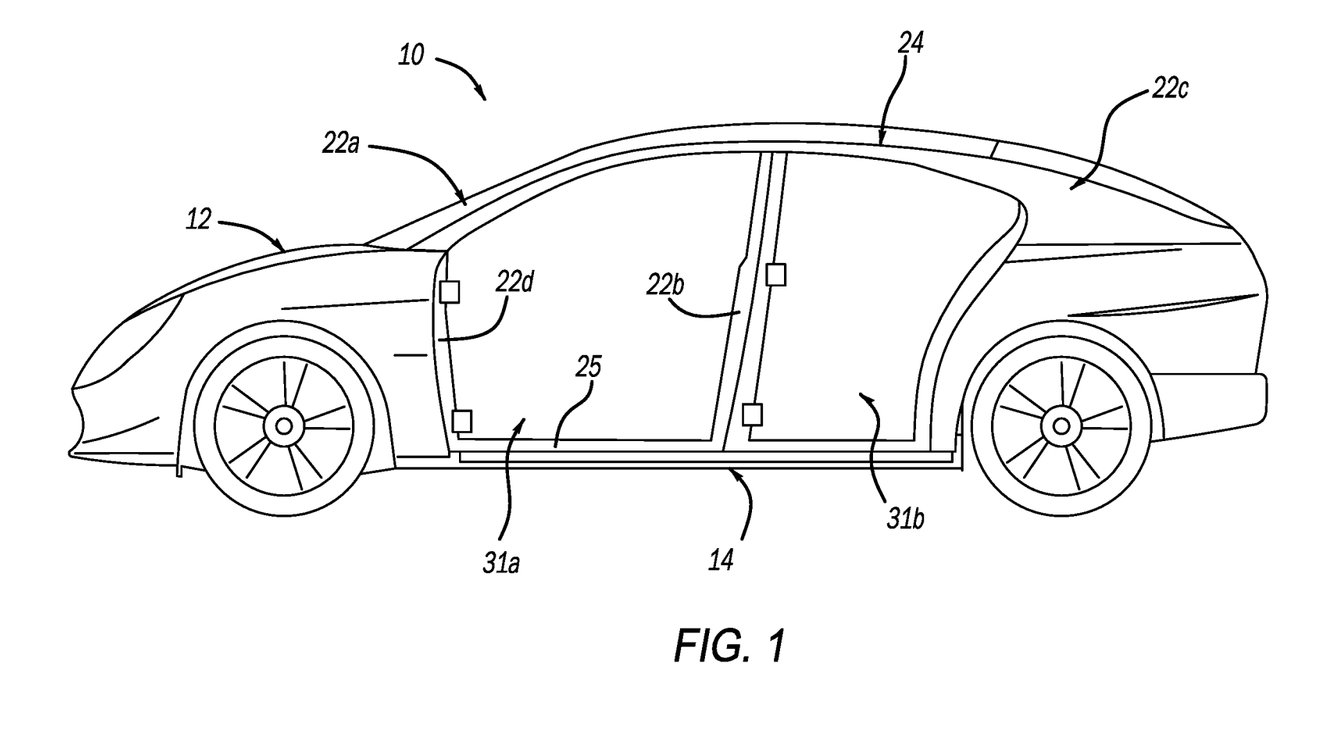
FIG. 1 is a side view of a vehicle including a battery pack according to the principles of the present disclosure.
Figure 2:
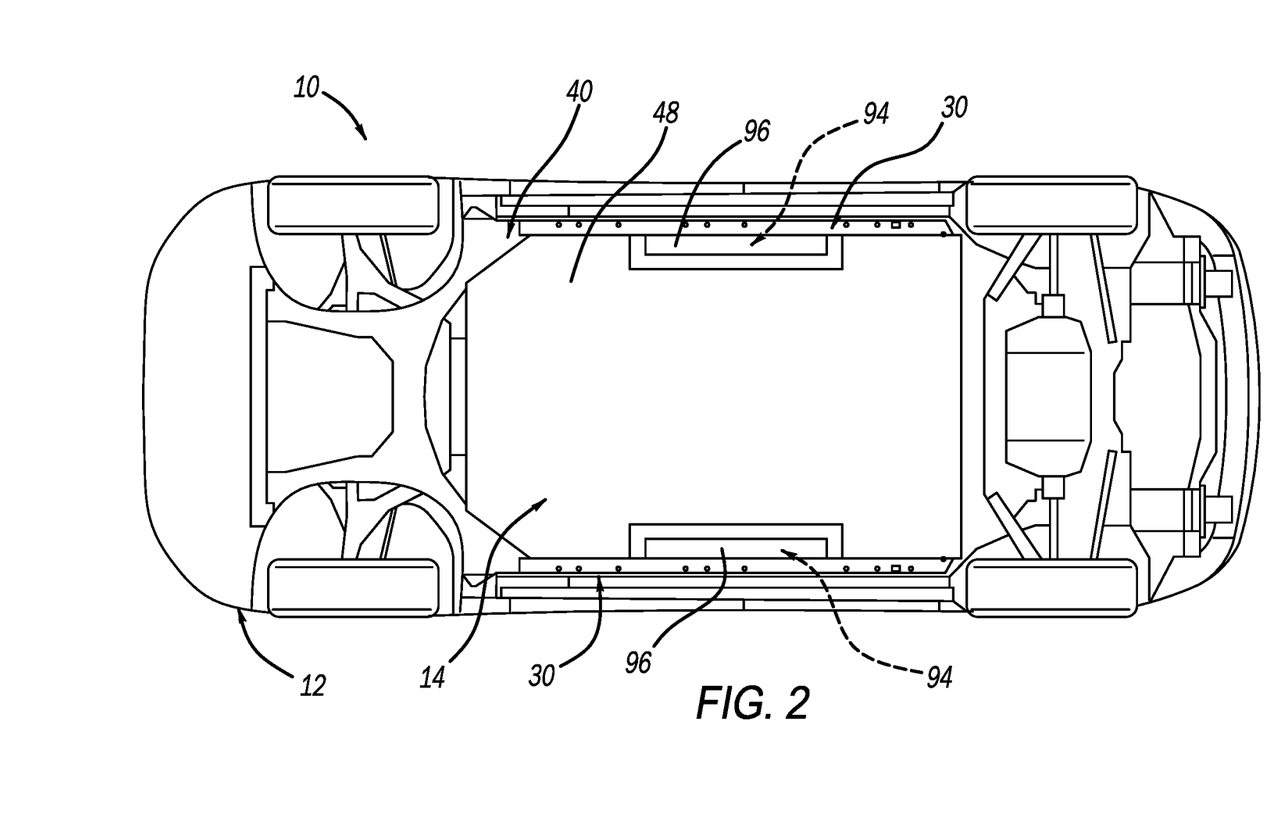
FIG. 2 is a bottom view of the vehicle of FIG. 1.

With reference to FIGS. 1 and 2, a vehicle 10 (FIG. 1) such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a vehicle body structure 12 and a battery housing assembly 14 (also referred to herein as a battery pack). In the example illustrated, the vehicle body structure 12 is the main supporting structure of the vehicle 10, to which various components are attached either directly or indirectly. The vehicle body structure 12 includes a plurality of vertical body-mounted pillars, roof side rails 24 (only one shown in the figures), and sills 25. The front, middle, and rear pillars, the sills 25 and the roof side rails 24 cooperate to define front door openings 31a in the vehicle body structure 12. The middle and rear vertical body-mounted pillars, the sills 25, and the roof side rails 24 cooperate to define rear door openings 31b in the vehicle body structure 12. Doors (not shown) are rotatably coupled to the vehicle body structure 12 (e.g., hinge pillars or the middle pillars) to be rotated between a closed position in which the doors are disposed within the door openings 31a or 31b and an open position in which the doors are removed from the door openings 31a or 31b. In the example illustrated, the vehicle body structure 12 is a unibody vehicle architecture, though other configurations can be used, such as a body on frame vehicle architecture for example.

The battery housing assembly 14 powers one or more motors to drive a set of drive wheels. For example, the battery housing assembly 14 may power a rear motor (not shown) to drive rear wheels of a set of rear wheels via a rear axle (not shown) and/or may power a front motor (not shown) to drive front wheels of a set of front wheels via a front axle (not shown).

Figure 3:
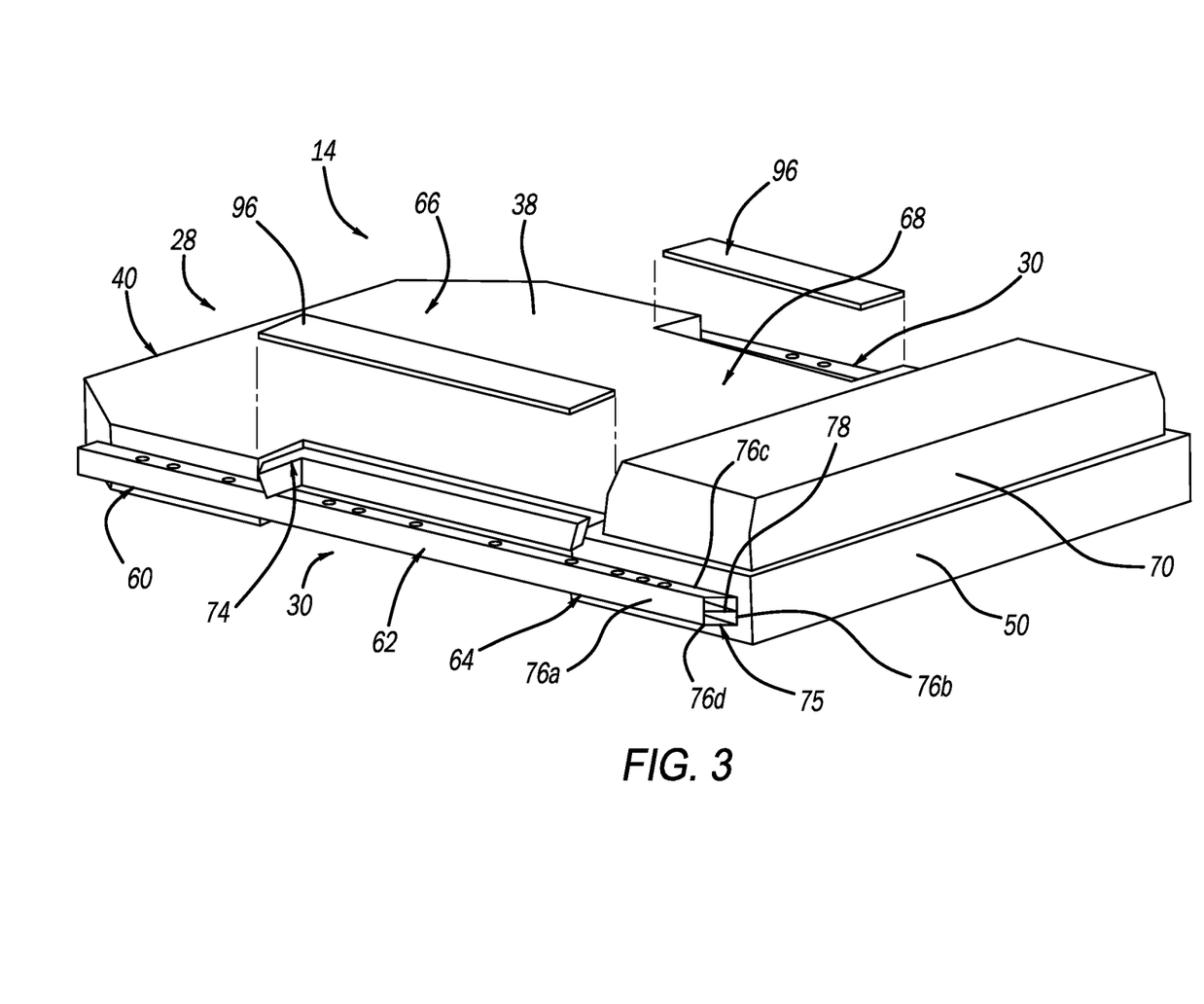
FIG. 3 is a perspective view of the battery pack of the vehicle of FIG. 1.
Figure 4:
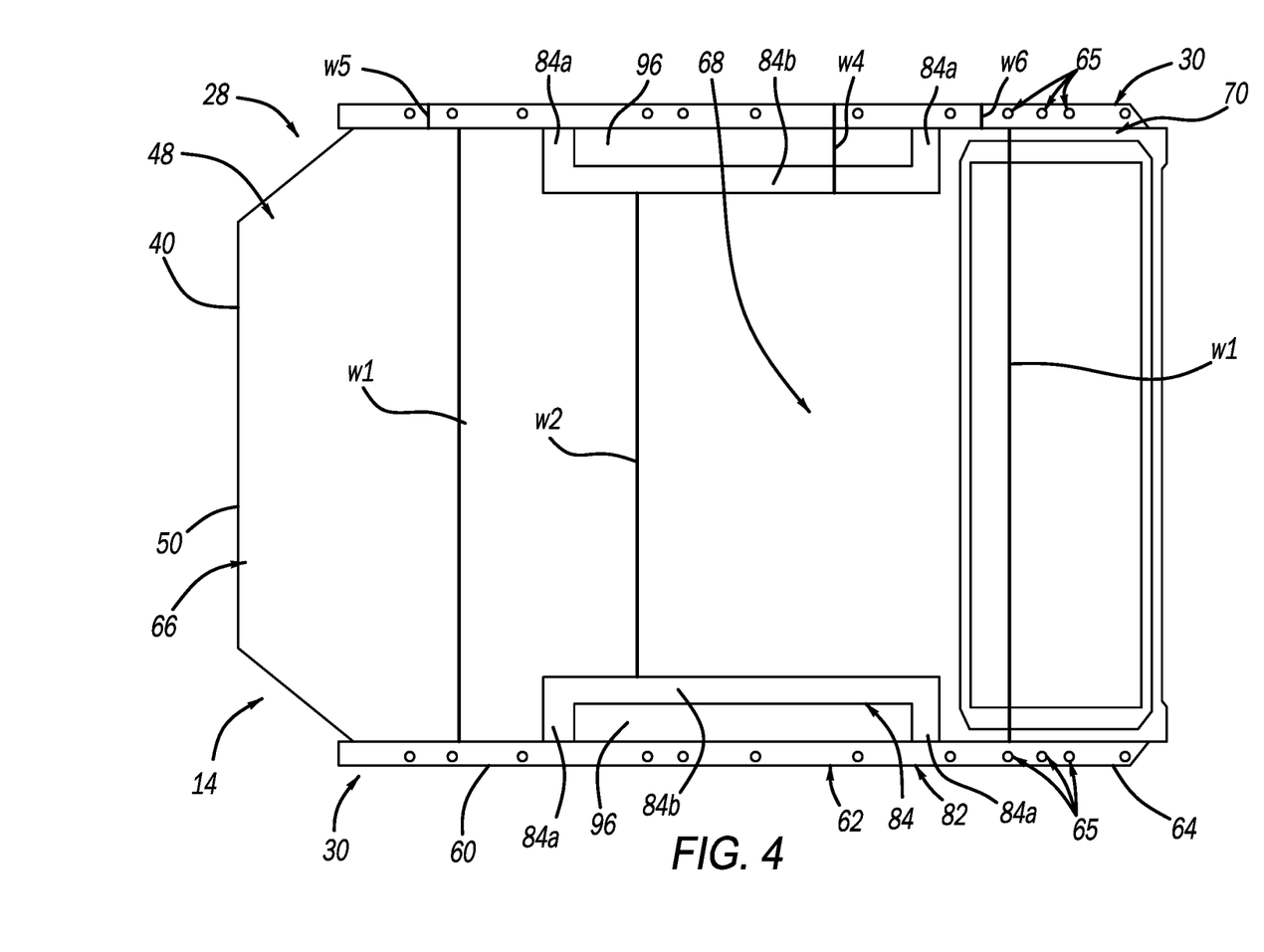
FIG. 4 is a bottom view of the battery pack of FIG. 1.
Figure 5:
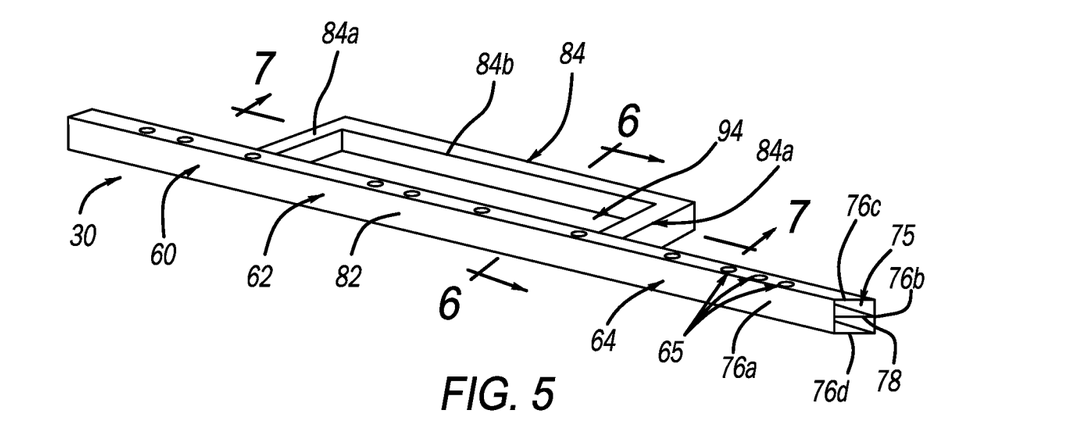
FIG. 5 is a perspective view of one rocker structure of the battery pack if FIG. 1.

With reference to FIGS. 2-4, the battery housing assembly 14 includes one or more battery arrays (not shown), a battery tray or housing 28, and a pair of rocker structures or frames 30 located at opposing sides of the battery housing 28. The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other. In the example illustrated, the battery housing 28 has a generally H shape.

The battery housing 28 may be disposed at various locations of the vehicle 10 and is mounted to the vehicle body structure 12. In this way, the battery housing 28 is supported by the vehicle body structure 12 and is remote from a passenger cabin (not shown) and cargo compartments (not shown) of the vehicle 10, therefore, not occupying space that would otherwise be available for passengers or cargo. The battery housing 28 includes a lid 38 (FIG. 3) and a body 40. The lid 38 covers the top of the body 40 and is removably coupled to the body 40 via mechanical fasteners such as bolts or screws (not shown), for example. In this way, the lid 38 may be removed to service the battery arrays disposed within the battery housing 28.

The body 40 includes a bottom wall or panel 48 (FIGS. 2 and 4) and one or more side walls or panels 50. The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend from the bottom wall 48 in a vertical direction. The side walls 50 define an outer boundary of the body 40 and are secured to each other via welding or an adhesive, for example. A seal (not shown) is disposed around a periphery of the side walls 50 of the battery housing 28 and is engaged with side walls 50 and the lid 38. In this way, fluids, debris and other materials are inhibited from entering into the battery housing 28.

With reference to FIGS. 2-5, the rocker structures 30 extend lengthwise in a longitudinal direction of the vehicle 10 and are configured to mount the battery housing 28 to the vehicle body structure 12 (e.g., to the sills 25 of the vehicle body structure 12). Each rocker structure 30 is made of a metal material such as aluminum, for example, and is secured to a respective side of the battery housing 28 using fasteners, adhesives, welding, or any other suitable attachment means, for example. Each rocker structure 30 includes a front section 60, a middle section 62, and a rear section 64. Each rocker structure 30 also includes mounting apertures 65 located along a length of the rocker structure 30 (i.e., the mounting apertures 65 are formed in and along the front, middle, and rear sections 60, 62, 64 of the rocker structure 30). Fasteners (not shown) may extend through the mounting apertures 65 and the sills 25 of the vehicle body structure 12, thereby mounting the battery housing 28 to the vehicle body structure 12.

The front section 60 is proximate a front region 66 of the battery housing 28, the middle section 62 is proximate a middle region 68 of the battery housing 28 and the rear section 64 is proximate a rear region 70 of the battery housing 28. In terms of the longitudinal direction of the vehicle 10, the front section 60 and front region 66 are forward of the middle section 62 and middle region 68, which is forward of the rear section 64 and rear region 70. In the example illustrated, the front and rear regions 66, 70 have widths w1, which are equal to each other. In another example, the width of the front region 66 may have a width that is greater than or less than the width of the rear region 70 but both widths of the front and rear regions 66, 70 are greater than w2. In the example illustrated, the front, middle, and rear regions 66, 68, 70 of the battery housing 28 define a cut-out 74 (FIG. 3) that receives a portion of a respective rocker structure 30.

The front section 60 of the rocker structure 30 and the rear section 64 of the rocker structure 30 are longitudinally aligned with each other and have a generally rectangular shape. Each of the front and rear sections 60, 64 includes a plurality of walls that cooperate to define a cavity 75 (FIGS. 3 and 5; i.e., an outboard vertical wall 76a, an inboard vertical wall 76b, an upper horizontal wall 76c and a lower horizontal wall 76d). The outboard vertical wall 76a defines an outer boundary of the rocker structure 30. The inboard vertical wall 76b contacts the battery housing 28. The upper and lower horizontal walls 76c, 76d extend in a transverse direction and connect the vertical walls 76a, 76b to each other. In the example illustrated, the rocker structure 30 includes one or more internal stiffening members 78 located in the cavity 75 and configured to absorb energy during a side vehicle impact event. The internal stiffening members 78 may be ribs or webbing extending in a horizontal direction and/or a vertical direction.

Figure 6:
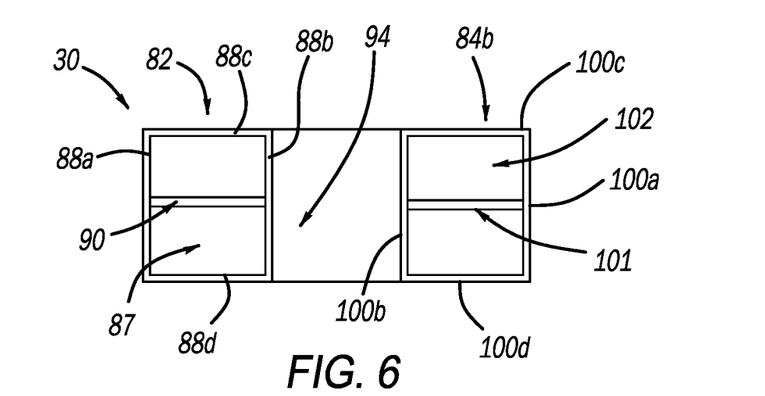
FIG. 6 is a cross-sectional view of the rocker structure taken along line 6-6 of FIG. 5.

The middle section 62 extends in a forward direction past a respective middle pillar 22b and extends in a rear direction past the respective middle pillar 22b (FIG. 1). As best shown in FIG. 4, the middle section 62 of the rocker structure 30 includes a width w4 that is greater than widths w5, w6 of the front and rear sections 60, 64, respectively. In this way, the rocker structure 30 includes a variable width along a length of the rocker structure 30. In one form, the width w4 of the middle section 62 is at least two times greater than the widths w5, w6 of the front and rear sections 60, 64, respectively. In other forms, the width w4 of the middle section 62 is at least four times greater than the widths w5, w6 of the front and rear sections 60, 64, respectively. The middle section 62 includes an outer member 82 and an inner member 84. The outer member 82 is longitudinally aligned with the front section 60 and the rear section 64 and includes the mounting apertures 65. As shown in FIG. 6, the outer member 82 also includes a plurality of walls that cooperate to define a cavity 87 (i.e., an outboard vertical wall 88a, an inboard vertical wall 88b, an upper horizontal wall 88c and a lower horizontal wall 88d). In the example illustrated, the outer member 82 includes one or more internal stiffening members 90 located in the cavity 87 and configured to absorb energy during a side vehicle impact event. The internal stiffening member(s) 90 may be a part of the internal stiffening member(s) 78 or may be separate therefrom.

Figure 8:
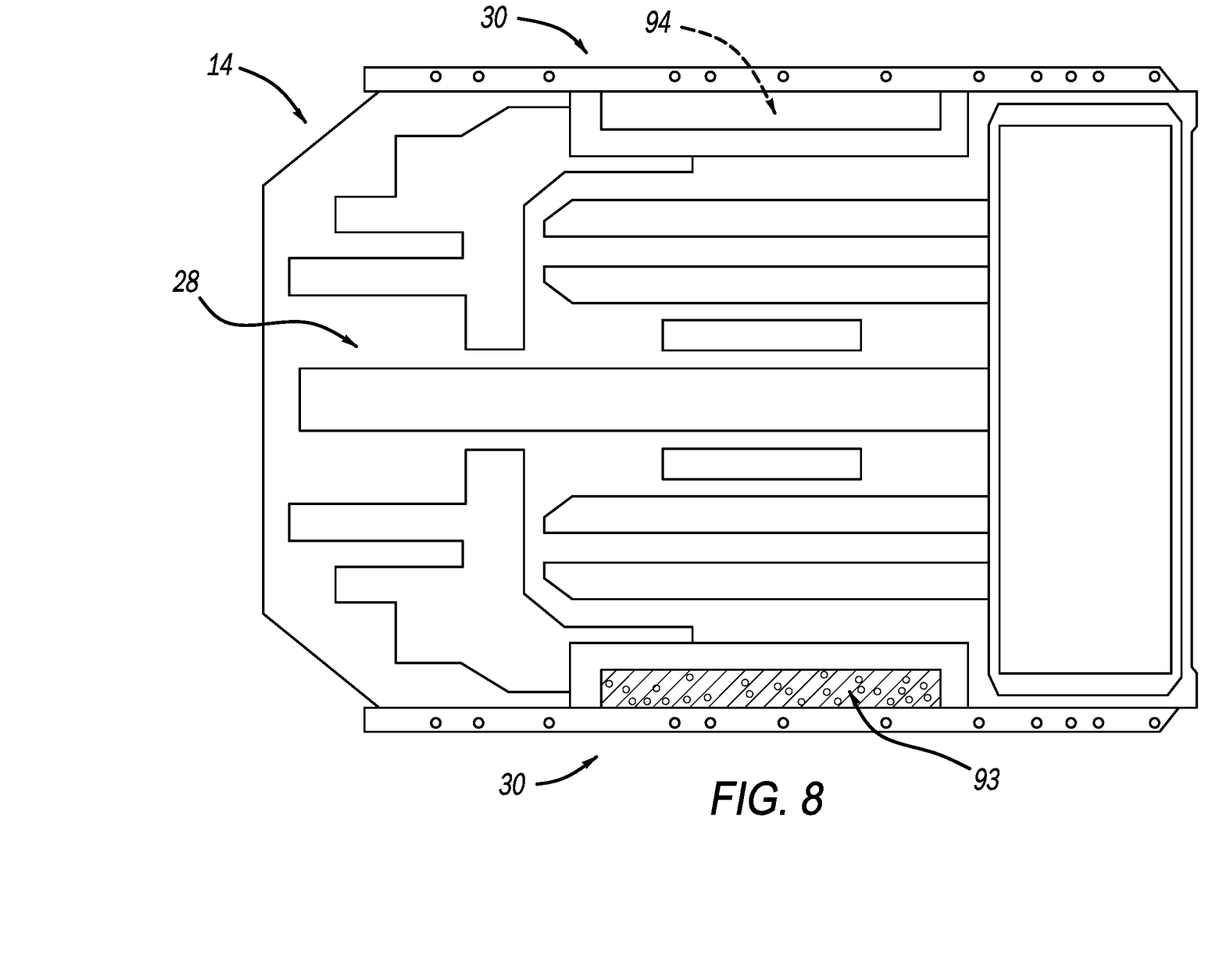
FIG. 8 is a bottom view of an alternate battery pack that can be incorporated into the vehicle of FIG. 1, according to the principles of the present disclosure.

The inner member 84 extends into the cut-out 74 of the battery housing 28 and cooperates with the outer member 82 to form an elongated cavity 94. In this way, during a side impact event, the outer member 82 can protrude into the elongated cavity 94, which can reduce impact loads transferred to the middle region 68 of the battery housing 28. Stated differently, the outer member 82 can deform inwardly into the elongated cavity 94 during a side impact event, which reduces the load transferred to the middle region 68 of the battery housing 28. In some forms, as shown in FIG. 8, an optional foam material 93 is provided within the elongated cavity 94 to reduce road noise. The foam material 93 is a low-density foam that does not provide structural support for the rocker structure 30. A cover plate 96 is secured to the middle section 62 of the rocker structure 30 (e.g., the outer member 82 and/or the inner member 84) and covers the elongated cavity 94 from below to inhibit debris from the road from entering into the elongated cavity 94.

Figure 7:
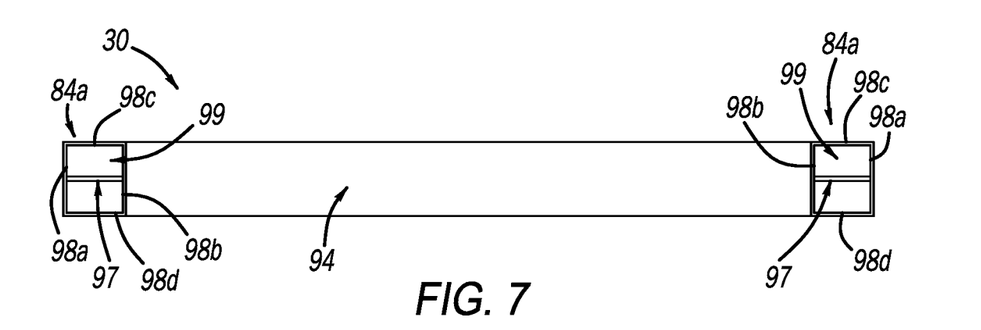
FIG. 7 is a cross-sectional view of the rocker structure taken along line 7-7 of FIG. 5.

The inner member 84 also includes transverse braces 84a and a longitudinal brace 84b. The transverse braces 84a are spaced apart from each other and extend in a transverse direction relative to a longitudinal direction of the vehicle 10. A first transverse brace 84a extends from the outer member 82 to a first end of the longitudinal brace 84b and a second transverse brace 84a extends from the outer member 82 to a second end of the longitudinal brace 84b that is opposite the first end. As shown in FIG. 7, each transverse brace 84a includes a plurality of walls (i.e., an outer vertical wall 98a, an inner vertical wall 98b, an upper horizontal wall 98c and a lower horizontal wall 98d). The inner vertical wall 98b partially defines the elongated cavity 94 and the outer vertical wall 98a engages the battery housing 28. In the example illustrated, each transverse brace 84a includes one or more internal stiffening members 97 located in a cavity 99 and configured to absorb energy during a side vehicle impact event.

The longitudinal brace 84b extends parallel to the outer member 82 and perpendicular to the transverse braces 84a. The longitudinal brace 84b is spaced apart from outer member 82 and contacts the middle region 68 of the battery housing 28. As shown in FIG. 6, the longitudinal brace 84b includes a plurality of walls (i.e., an outer vertical wall 100a, an inner vertical wall 100b, an upper horizontal wall 100c and a lower horizontal wall 100d). The outer vertical wall 100a engages the battery housing 28 and the inner vertical wall 100b partially defines the elongated cavity 94. In some forms, the longitudinal brace 84b may include one or more internal stiffening members 101 located within a cavity 102 of the longitudinal brace 84b and configured to absorb energy during a side vehicle impact event.

The rocker structure 30 of the present disclosure reduces impact loads transferred to the battery housing 28 during an impact event. It should be understood that although the present disclosure shows and describes the middle section 62 of the rocker structure reducing impact loads near the middle region 68 of the battery housing 28, the structure of the middle section 62 may be incorporated into the front section 60 to reduce impact loads to the front region 66 of the battery housing 28 and/or incorporated into the rear section 64 to reduce impact loads to the rear region 70 of the battery housing. The rocker structure 30 of the present disclosure also reduces the impact loads being transferred to the battery housing 28 while at least maintaining the volume and density of the battery pack, thereby at least maintaining the traveling range of the vehicle 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery pack for an electric vehicle, the battery pack comprising:
    a battery housing configured to house power storage units; and
    a pair of rocker structures located at opposing sides of the battery housing and configured to mount the battery pack to a vehicle body structure, wherein each rocker structure includes a variable width along a length of the rocker structure, each rocker structure includes an inner member, and an outer member spaced apart from the inner member and cooperating with the inner member to define an elongated cavity, wherein the battery housing includes a region that corresponds to a widest portion of each rocker structure.

2. The battery pack of claim 1, wherein the widest portion of each rocker structure is located near a middle section of each rocker.

3. The battery pack of claim 1, wherein each rocker structure includes a rear section, a front section, and a middle section, and wherein the middle section is the widest portion of each rocker structure, the middle section having a length that is at least two times greater than a length of the rear section and is at least two times greater than a length of the front section.

4. The battery pack of claim 3, wherein the middle section defines the elongated cavity.

5. The battery pack of claim 1, wherein the widest portion of each rocker structure defines the elongated cavity.

6. The battery pack of claim 5, wherein a foam material is disposed within the elongated cavity.

7. The battery pack of claim 6, wherein the widest portion of each rocker structure is located near a middle section of each rocker.

8. The battery pack of claim 6, wherein a cover plate is secured to a respective rocker structure and covers an opening to the elongated cavity.

9. The battery pack of claim 1, wherein each rocker structure includes internal stiffening members.

10. The battery pack of claim 1, wherein the widest portion of each rocker structure is at least four times greater than a narrowest portion of each rocker structure.

11. The battery pack of claim 10, wherein the widest portion of each rocker structure is at least two times greater than the narrowest portion of each rocker structure.

12. The battery pack of claim 1, wherein the region of the battery housing that corresponds to the widest portion of each rocker structure is a middle region, and wherein a width of the middle region is less than a width of a rear region of the battery housing and a width of a front region of the battery housing.

13. A battery pack for an electric vehicle, the battery pack comprising:
a battery housing configured to house power storage units; and
a pair of rocker structures secured to opposing sides of the battery housing and configured to mount the battery pack to a vehicle body structure, each rocker structure has a variable width along a length of the rocker structure and includes an elongated cavity and mounting apertures, the mounting apertures located outboard of the elongated cavity at or near an outermost portion of the rocker structure and configured to mount the pair of rocker structures to the vehicle body structure,
wherein the battery housing includes a region that corresponds to a widest portion of each rocker structure, the elongated cavity being located at the widest portion of each rocker structure.

14. The battery pack of claim 13, wherein each rocker structure includes a rear section, a front section, and a middle section, and wherein the middle section is the widest portion of each rocker structure, the middle section having a length that is at least two times greater than a length of the rear section and a length of the front section.

15. The battery pack of claim 14, wherein a foam material is disposed within the elongated cavity.

16. The battery pack of claim 13, wherein a cover plate is secured to a respective rocker structure and covers an opening to the elongated cavity.

17. The battery pack of claim 13, wherein each rocker structure includes internal stiffening members.

18. An electric vehicle comprising:
a vehicle body structure including a pair of side frames; and
a vehicle battery pack comprising:
a battery housing configured to house power storage units; and
a pair of rocker structures secured to opposing sides of the battery housing and configured to mount the battery pack to the pair of side frames of the vehicle body structure, each rocker structure has a variable width along a length of the rocker structure and includes an unoccupied elongated cavity and mounting apertures, the mounting apertures located outboard of the elongated cavity,
wherein the battery housing includes a region that corresponds to a widest portion of each rocker structure, the unoccupied elongated cavity being located at the widest portion of each rocker structure.

19. The electric vehicle of claim 18, wherein the vehicle body structure includes middle pillars, and wherein the widest portion of each rocker structure extends in a forward direction past a respective middle pillar and extends in a rear direction past the respective middle pillar.

20. The electric vehicle of claim 18, wherein a cover plate is secured to a respective rocker structure and covers an opening to the elongated cavity.

* * * * *